May 8, 1962 G. E. NICHOLS 3,033,501
CALENDAR MOUNT

Filed Feb. 15, 1961 3 Sheets-Sheet 1

INVENTOR.
Gordon E. Nichols
BY Roberts, Cushman & Grover
ATT'YS

May 8, 1962  G. E. NICHOLS  3,033,501
CALENDAR MOUNT

Filed Feb. 15, 1961  3 Sheets-Sheet 2

INVENTOR.
Gordon E. Nichols
BY Roberts, Cushman & Grover
ATT'YS

May 8, 1962 G. E. NICHOLS 3,033,501
CALENDAR MOUNT
Filed Feb. 15, 1961 3 Sheets-Sheet 3
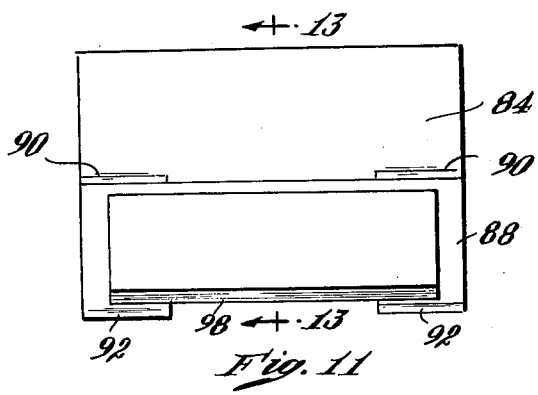
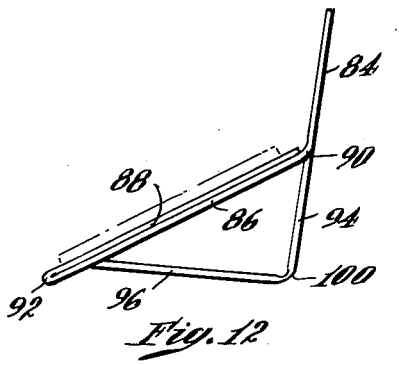
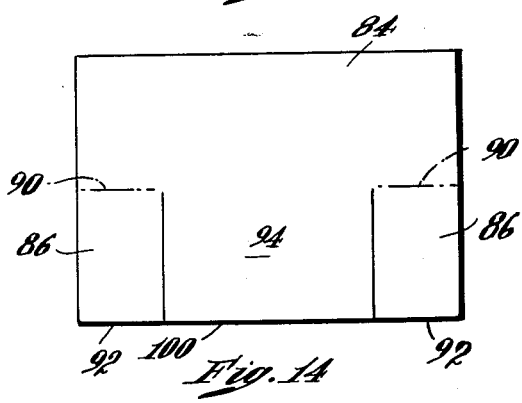
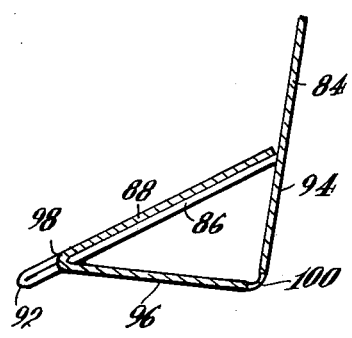
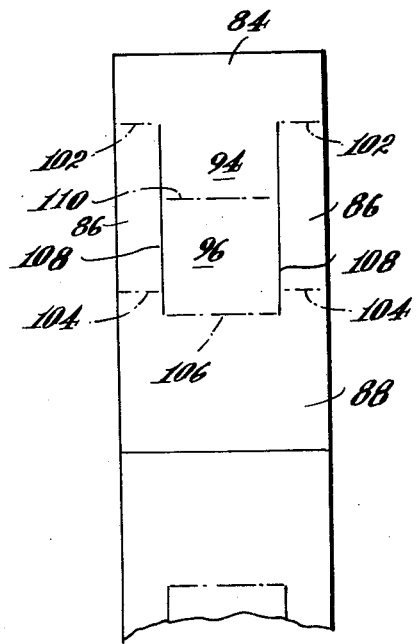
INVENTOR.
Gordon E. Nichols
BY Roberts, Cushman & Grover
ATT'YS

United States Patent Office 3,033,501
Patented May 8, 1962

3,033,501
CALENDAR MOUNT
Gordon E. Nichols, Middleboro, Mass., assignor to Winthrop-Atkins Co., Inc., Middleboro, Mass., a corporation of Massachusetts
Filed Feb. 15, 1961, Ser. No. 89,409
13 Claims. (Cl. 248—35)

This invention relates to mounts for calendar pads, photographs and the like, manufactured of cardboard, and has for its principal objects to provide a mount of the type having a low angle, slant front supporting surface to which the pad or photograph may be attached; which combine sturdiness and durability with a pleasing appearance; which may be manufactured from a single sheet of board; is economical of material; requires no assembly; is adapted in certain forms to provide memorandum surfaces and to be foldable into a flat compact package; and may be made in duplicate in one dieing operation.

As herein illustrated, the mount comprises an upright head panel, a leg at its lower edge, laterally spaced supports extending forwardly and downwardly from the lower edge of the head panel at an obtuse angle, a cover panel resting on the supports and a brace situated between the cover panel and the leg, with its forward end connected by hinge means to the panel along lines spaced upwardly and parallel to the lower ends of the supports, and its rear end operably connected to the leg to hold the leg in an operative position and simultaneously to hold the cover panel against the supports. Optionally, a tongue may be provided at the upper edge of the cover panel for engagement with an aperture at the lower edge of the head panel to further secure the cover panel in engagement with the supports. In the form in which the tongue and aperture are employed, the composite length of the leg less the tongue and the brace is less than the distance between the hinge means connecting the head panel to the supports and the hinge means connecting the brace to the cover panel, so that, by folding the cover panel forwardly to a horizontal position, it provides a stable footing for holding the brace, supports and head panel in an upright position with the brace sloping rearwardly with respect to the upper surface of the cover panel, thereby exposing the normally concealed surfaces of the cover panel and the brace for memoranda. In another form, the brace and leg correspond in length to the distance between the hinge means connecting them to the head panel and cover panel respectively, so that folding the cover panel forwardly disposes the panels, supports, leg and brace in a single plane. In each of the forms the brace is hinged to the cover panel along a line parallel to the hinge means connecting the cover panel and the supports, so that the brace acts not only to hold the leg in operative position, but also to hold the cover panel in engagement with the supports. Optionally, means may be provided at the upper edge of the cover panel, engageable with other means at the lower edge of the head panel, shown herein as a tab on the cover panel and an aperture in the head panel, to hold the cover panel engaged with the supports.

The invention will now be described in greater detail with reference to the accompanying drawings wherein:

FIG. 11 is a front elevation of a third form of the mount;

FIG. 12 is an end elevation of FIG. 11;

FIG. 13 is a vertical section taken on the line 13—13 of FIG. 11;

FIG. 14 is a rear elevation of FIG. 11; and

FIG. 15 is a plan view of dual blanks, one of which is shown in full, from which the mount of FIGS. 11 to 14 inclusive is made.

Figure 1:
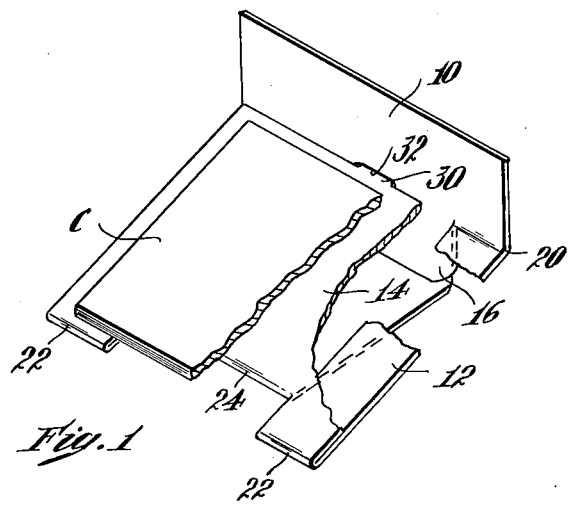
FIG. 1 is a perspective view of the front side of one form of the mount.

Each of the mounts, which will be described hereinafter with reference to the figures, is of the type having a substantially upright head panel upon which advertising indicia and/or decorative material may be printed, embossed, or the like, low angle, forwardly inclined supporting means and a cover panel resting thereon, to the upper surface of which a calendar pad, or the like, may be stapled, the latter being foldable forwardly, in some instances, to provide memorandum areas and the like.

Referring specifically to FIGS. 1 to 5 inclusive, the mount, which is made of a single sheet of cardboard, preferably covered with a decorative material, has a head panel 10 which is disposed in an upright position, a leg 16 extending downwardly therefrom, laterally spaced supports 12—12 extending forwardly and downwardly from the lower edge of the head panel at an obtuse angle, a cover panel 14 resting on the supports 12—12, and a brace 18 disposed between the cover panel and leg. The supports 12—12 are connected at their upper ends to the lower edge of the head panel by laterally spaced hinge means 20—20 and at their lower ends to the lower edge of the cover panel by laterally spaced hinge means 22—22. The leg 16 is situated between the hinge means 20—20 and forms an integral rigid extension of the head panel 10. The lower extremity of the leg 16, in conjunction with the lower ends of the supports 12—12 constitute the footing for the mount. The brace 18 is situated between the hinge means 22—22 and is connected at its forward end to the cover panel 14 by hinge means 24, which is spaced upwardly from and parallel to the hinge means 22—22. The lower end of the leg and the distal end of the brace are operably connected by a tongue 26, at the lower extremity of the leg, which fits into a notch 28 at the rear extremity of the brace. The brace, as thus hinged to the cover panel, operates not only to hold the leg in its operative position, but also to hold the cover panel against the supports. Additional means may also be provided for this purpose in the form of a tongue 30, at the upper edge of the cover panel, which is adapted to be engaged with an opening 32 in the head panel adjacent its lower edge.

Figure 2:
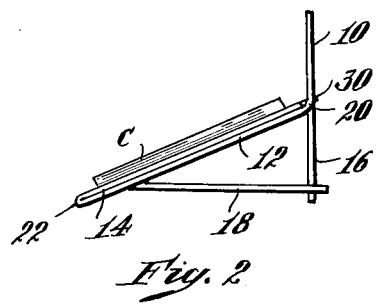
FIG. 2 is an end elevation.
Figure 3:
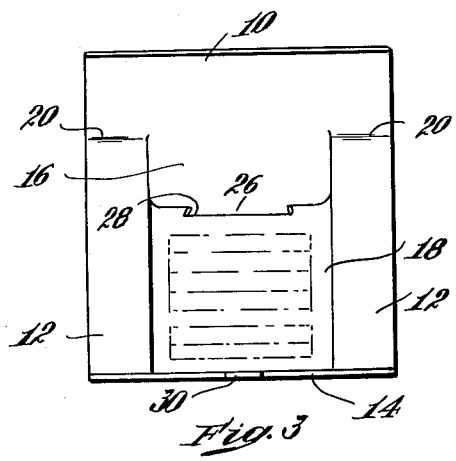
FIG. 3 is a front elevation with the cover panel folded forwardly.
Figure 4:
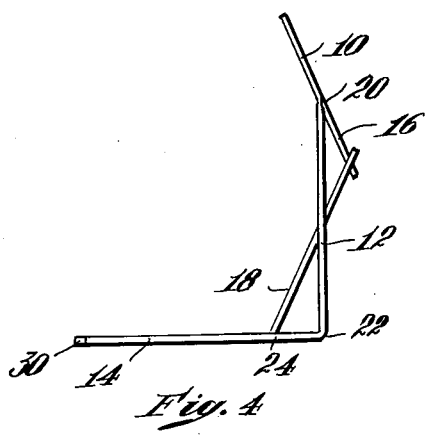
FIG. 4 is a side elevation of FIG. 3.

In its ordinary use the mount occupies a position, as shown in FIGS. 1 and 2, so that the calendar pad C is visible. The mount, however, has a second position which is illustrated in FIGS. 3 and 4, and which is adapted in this second position to expose memorandum areas or areas bearing telephone numbers, or the like, of importance. The mount is set up in the second position by folding the cover panel 14 forwardly so that it forms a supporting base for the mount, as shown in FIG. 4. Such forward movement of the cover panel operates through the brace 18 to dispose the supports 12—12 upright and to tilt the head panel 10 forwardly at a slight angle. In this position the brace 18 slopes upwardly from the cover panel 14 at an oblique angle. The exposed front surface of the brace and the exposed upper surface of the cover panel 14 provide areas for phone numbers and the like.

Figure 5:
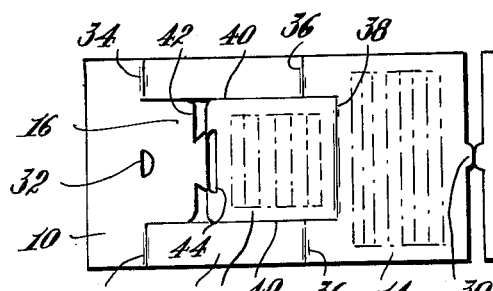
FIG. 5 shows a plan view of dual blanks, one shown in full, cut to provide the mount shown in FIGS. 1 to 4 inclusive.
Figure 6:
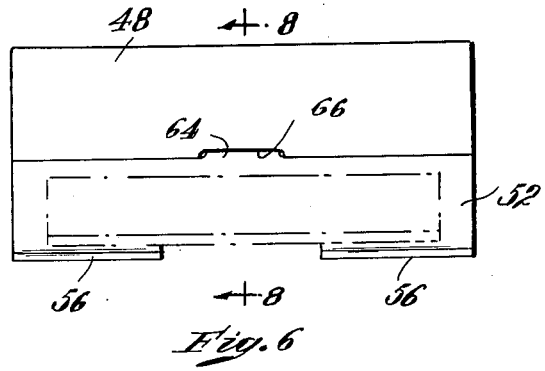
FIG. 6 is a front elevation of a modified form of mount.
Figure 7:
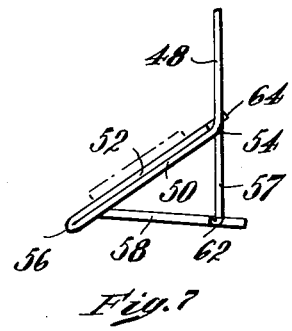
FIG. 7 is an end elevation of the mount shown in FIG. 6.
Figure 9:
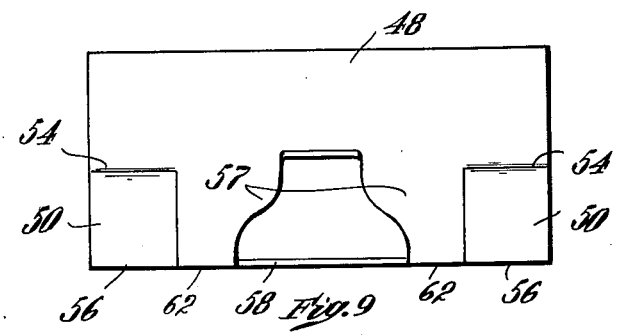
FIG. 9 is a rear elevation of the mount shown in FIG. 6.
Figure 8:
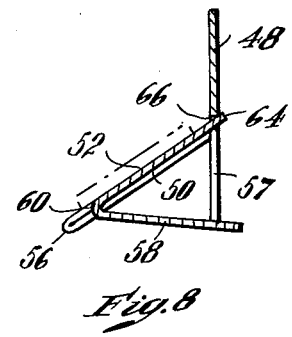
FIG. 8 is a vertical section taken on the line 8—8 of FIG. 6.

The mount described above is, as stated, made from a single blank of cardboard covered on one or both sides with a decorative paper and may be made in duplicate, that is, two blanks of identical construction may be made end-to-end, as shown in FIG. 5, by a die provided with symmetrically disposed cutting and embossing tools. The panel 10, supports 12—12 and panel 14 are formed by embossing the blank at longitudinally spaced parallel lines 34—34, 36—36 and 38, and joining the adjacent ends of these embossed areas by transversely spaced parallel cuts 40—40. The leg 16 and brace 18 are then separated and the locking tongue 26 and notch 28 simultaneously formed by cutting along the deviating lines 42 and 44.

Because of the fact that the panel 10, supports 12—12 and panel 14 are all foldable in the same direction, the hinge means 34—34, 36—36 and 38 may all be made at one time by means of the dieing tools, simply by embossing or scoring and without having to reverse the blank for operation on the other side which simplifies and expedites manufacture and eliminates the necessity of employing hinge structure of the kind wherein the edges of the panels are connected by the covering material, so as to be foldable in either direction, although it is to be understood that this latter type of hinge may be employed herein.

The form of the invention shown in FIGS. 6 to 9, inclusive, has an upright head panel 48, downwardly extending, obtusely inclined supports 50—50, and a cover panel 52, the panels and supports being connected by transversely spaced hinge means 54—54 and 56—56 respectively. The leg 57 is an integral extension of the head panel 48 and the brace 58 is situated between the hinge means 56—56 and connected to the cover panel by hinge means 60 spaced from and parallel to the hinge means 56—56. In this form of the invention the brace and legs are connected at their adjacent ends by hinge means 62, FIG. 7. Consequently since the composite length of the leg and brace is equal to the distance between the hinge means connecting the leg to the head panel, and the hinge means connecting the brace to the cover panel, folding of the cover panel 52 forwardly into the plane of the inclined support 50—50 disposes the panels, supports, leg and brace in a common plane.

As in the previous form, the brace, by reason of its connection to the cover panel, operates not only to hold the leg upright, but to hold the cover panel in contact with the supports, however, as shown, it is desirable to have additional means in the form of a tongue 64 at the upper edge of the cover panel engaged within an opening 66 in the head panel near its lower edge.

Figure 10:
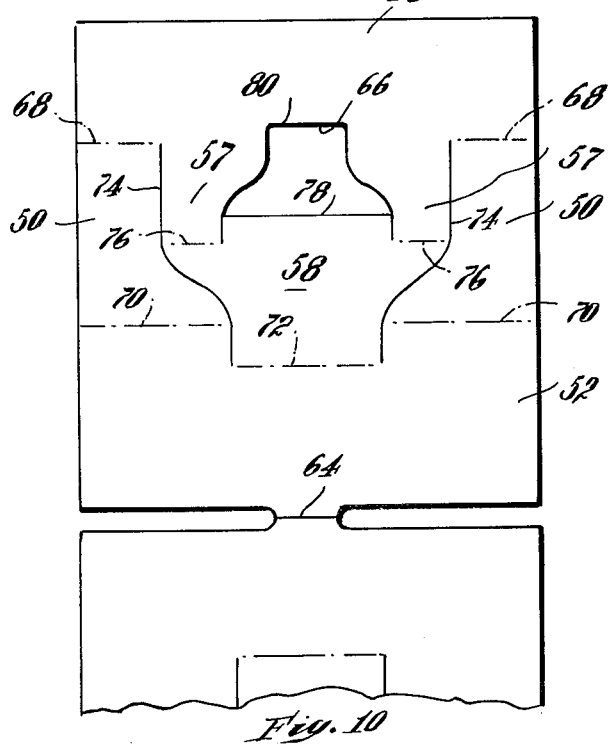
FIG. 10 is a plan view of dual blanks, one of which is shown in full, from which the mount shown in FIGS. 6 to 9 inclusive, is made.

The blank, from which the mount is made, is shown in FIG. 10 and, as indicated with respect to the other mounts, may be made in duplicate. The panel 48, supports 50—50 and panel 52 are separated by longitudinally spaced, transversely disposed crease lines 68—68, 70—70 and 72, and by transversely spaced, longitudinally extending cut lines 74—74. The leg 57 and brace 58 are connected by laterally spaced hinge means 76—76 formed by scoring the board transversely between the cut lines 74—74, intermediate the hinge means 68—68 and 70—70 and the leg 57 and brace 58 are formed by cutting along intersecting lines 78 and 80.

As in the previous form of the invention the panels, supports, leg and brace are all foldable in the same direction so that the hinges may be made at the same side by scoring or embossing, although, as indicated, the paper-type hinge may be employed if desired.

FIGS. 11, 12 and 13 show a third form of the invention in which the head panel 84, the supports 86—86 and the cover panel 88 are connected by hinge means 90—90 and 92—92. The leg 94 is situated between the hinge means 92—92 and extends rigidly downward from the head. The brace 96 is situated between the hinge means 92—92 and is connected to the cover panel by hinge means 98 spaced from and parallel to the hinge means 92—92. The lower end of the leg 94 and the rear end of the brace 96 are connected by hinge means 100. In this form of the invention the brace 96 is relied upon solely to hold the cover panel 88 in engagement with the supports 86—86. Folding the cover panel 88 forwardly into the plane of the supports 86—86 disposes the panels, supports, brace and leg in a common plane.

This form of the mount is of the simplest construction and, as shown in FIG. 15, may be made in duplicate, as heretofore explained. The panel 84, supports 86—86 and panel 88 are separated by longitudinally spaced, transversely extending hinge means 102—102, 104—104 and 106 and by longitudinally extending, spaced parallel cuts 108—108. The adjacent ends of the brace and leg are connected by hinge means 110. All of the hinge means fold in the same direction as is common with the other mounts, thereby simplifying manufacture.

In each form of the mount the supports, as disclosed, are inclined at a low angle with respect to the head panel and the cover panel is correspondingly supported at a low angle so that the calendar pad, or other article attached thereto, is disposed in a convenient position for observation.

In the first two forms of the invention the cover panel is held down partially by the brace and partially by a tongue projecting through an opening in the head panel and in the last form is held down solely by the brace. It is within the scope of the invention however, in each of these forms, to fasten the cover panel down by means of staples, stitching, adhesive, or the like, where there is no call for folding the cover panel forwardly as there is in the form shown in FIG. 1, or for collapsing the mount after it has once been set up.

The several forms illustrated herein provide sturdy, attractive structures which are especially adapted to economical use of material and expedience in manufacture.

It should be understood that the present disclosure is for the purpose of illustration only and that this invention includes all modifications and equivalents which fall within the scope of the appended claims.

I claim:

1. A mount comprising a head panel, inclined supporting means, hinge means connecting the supporting means to the head panel along a line spaced downwardly from and parallel to the upper edge of the head panel, a leg connected to the head panel having a portion which extends beyond the hinge means connecting the supporting means to the head panel, the lower ends of the leg and supporting means collectively providing a footing for the mount, a cover panel disposed on the upper side of the downwardly inclined supporting means, hinge means connecting the lower edge of the cover panel to the supporting means, said supporting means containing an opening and a brace connected to the cover panel in spaced parallel relation to the last-named hinge means and extending rearwardly from the cover panel through the opening in the supporting means into engagement with the leg, said brace operating both to hold the leg in operative position and to hold the cover panel against the supporting means.

2. A mount comprising a head panel, a leg connected thereto for supporting the head panel with its lower edge elevated, a pair of laterally spaced supports connected to the head panel so as to extend forwardly and downwardly therefrom at an obtuse angle, the lower end of the leg and said spaced lower extremities of the supports collectively providing a footing for the mount, a cover panel disposed on the inclined supports, said cover panel being adapted to have fastened thereto a pad, or the like, and a brace connected at one end to the cover panel at a point intermediate its upper and lower edges, and at its opposite end to the leg, said brace being operable not only to hold the leg in its operative position, but also to hold said cover panel against said support.

3. A mount comprising a head panel, a leg at the lower edge of the head panel for supporting it upright, a pair of transversely spaced supports at opposite sides of the leg extending forwardly and downwardly from the lower edge of the head panel at obtuse angles to the head panel, hinge means connecting the upper ends of the supports to the lower edge of the head panel, a cover panel resting on the upper inclined surfaces of the supports, hinge means connecting the lower ends of the supports to the lower edge of the cover panel, a brace disposed between the cover panel and the leg with its forward end hingedly connected to the cover panel along a line spaced upwardly from and parallel to the hinge means connecting the lower ends of the supports to the cover panel, and means operably connecting the rear end of the brace to the leg to support the leg in its operative position and to hold the cover panel against the supports.

4. A mount comprising a head panel, laterally spaced supports and a cover panel, hinge means connecting the supports at one end to one edge of the head panel and at the other ends to one end of the cover panel so that they may be folded relative to each other to dispose the head panel in an upright position, the supports in a position inclined downwardly from the lower edge of the head panel at an obtuse angle thereto, and the cover panel in a correspondingly inclined position on the upper surfaces of the supports, a leg extending rigidly downwardly from the head panel below the hinge means connecting the head panel and the supports at an acute angle to the supports, the lower extremity of the leg and the lower ends of the supports collectively constituting a footing for the mount, a brace connected at its forward end to the cover panel above the hinge means connecting the cover panel to the supports, and means operably connecting the other end of the brace to the leg to support the leg in its operative position and to hold the cover panel against the supports.

5. A mount according to claim 2, wherein the distal end of the brace is operatively connected to the leg by a hinge.

6. A mount according to claim 2, wherein the distal end of the brace is operatively connected to the leg by a hinge and the composite length of the leg and brace is equal to the distance between the hinge means connecting the supports to the head panel and the hinge means connecting the brace to the cover panel when the panels lie in a common plane.

7. A mount according to claim 2, wherein the distal end of the brace and the leg are operatively connected by interengageable parts.

8. A mount according to claim 2, wherein the distal ends of the brace and the leg having interengageable parts operable to connect said ends and the composite length of the leg and brace less one of the interengageable parts is less than the distance between the hinge means connecting the leg to the head panel and the hinge means connecting the brace to the cover panel.

9. A mount according to claim 2, wherein the distal end of the brace is operatively connected to the leg by a hinge and the several hinges all fold in the same direction.

10. A mount according to claim 2, wherein the distal end of the brace is operatively connected to the leg by hinge means and the composite length of the leg and brace is equal to the distance between the hinge means connecting the supports to the head panel and the hinge means connecting the brace to the cover panel, so that folding the cover panel forwardly into a horizontal plane disposes the supports, brace, head panel and leg in an upright position in which the brace inclines rearwardly with respect to the cover panel.

11. A mount according to claim 2, wherein the distal ends of the leg and brace having interengageable parts and wherein the composite length of the brace and leg less one of the interengageable parts is less than the distance between the hinge means connecting the leg to the head panel and the hinge means connecting the brace to the cover panel, said cover panel being foldable forwardly and in said forwardly folded position being operable to support the head panel, leg, supports and brace in an upright position of stable equilibrium with the exposed face of the brace inclined rearwardly at an oblique angle to the upper face of the cover panel.

12. A mount comprising first and second panels, laterally spaced supports, hinge means connecting the opposite ends of the laterally spaced supports to the first and second panels, a leg member situated intermediate the hinge means connecting the supports to the first panel, a brace situated between the hinge means connecting the supports to the second panel along a line spaced from and parallel to the hinge means connecting the supports to the second panel, and hinge means interconnecting the brace and leg in such fashion that the panels can be disposed in one of two positions, a first position in which the first panel is disposed upright upon the leg, the supports slope downwardly from the first panel at an obtuse angle, the second panel rests on the upper sides of the supports and the brace extends rearwardly from the second panel to the leg, and a second position in which the second panel occupies a horizontal position, the supports in an upright position with the head panel held aloft and facing forwardly, and the brace sloping upwardly and rearwardly at an obtuse angle to the cover panel.

13. A mount according to claim 1 wherein the head panel contains an opening parallel to the hinge means connecting the supporting means thereto and the cover panel has a tongue at its upper edge which projects through the opening in the head panel when the cover panel lies against the supporting means, said tongue assisting in holding the cover panel in place.

References Cited in the file of this patent

UNITED STATES PATENTS 2,902,785    Nichols _____ Sept. 8, 1959